(No Model.) 3 Sheets—Sheet 1.
G. NITHACK.
DRUGGIST'S WEIGHING SCALE.

No. 494,685. Patented Apr. 4, 1893.

Witnesses:
Wm Schulz.
A Jonghmans.

Inventor:
G Nithack
by his attorneys,
Roeder & Briesen (No Model.) 3 Sheets—Sheet 2.

G. NITHACK.
DRUGGIST'S WEIGHING SCALE.

No. 494,685. Patented Apr. 4, 1893.

Witnesses:
Wm. Schulz
A. Jonghmans

Inventor:
G. Nithack
by his attorneys
Roeder & Briesen (No Model.) 3 Sheets—Sheet 3.
G. NITHACK.
DRUGGIST'S WEIGHING SCALE.
No. 494,685. Patented Apr. 4, 1893.
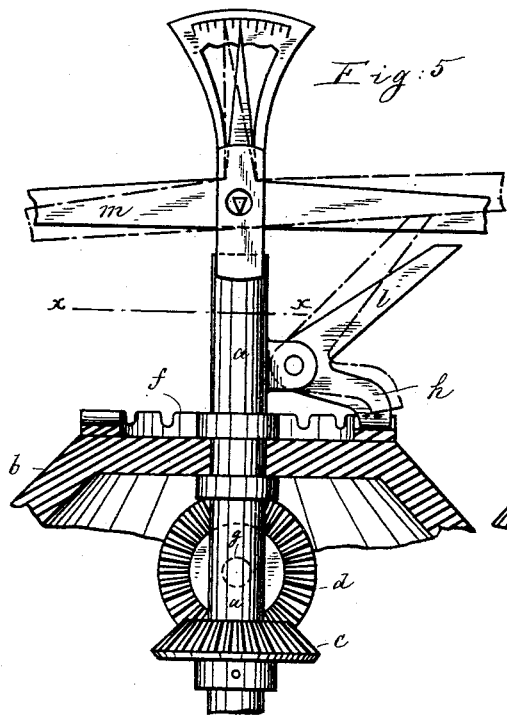
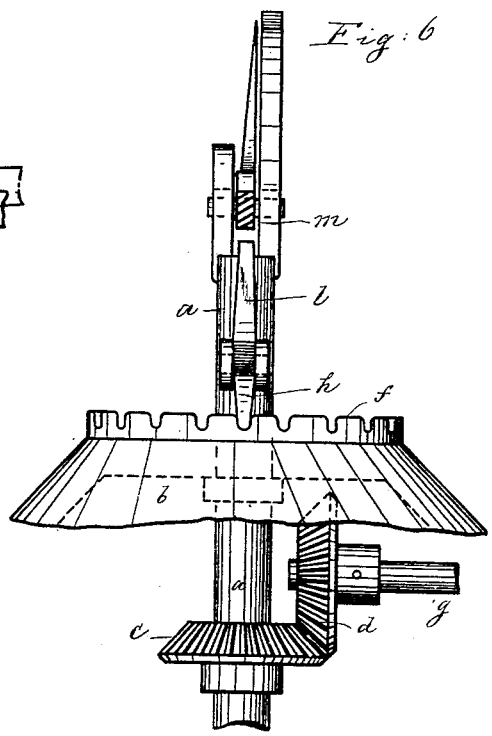
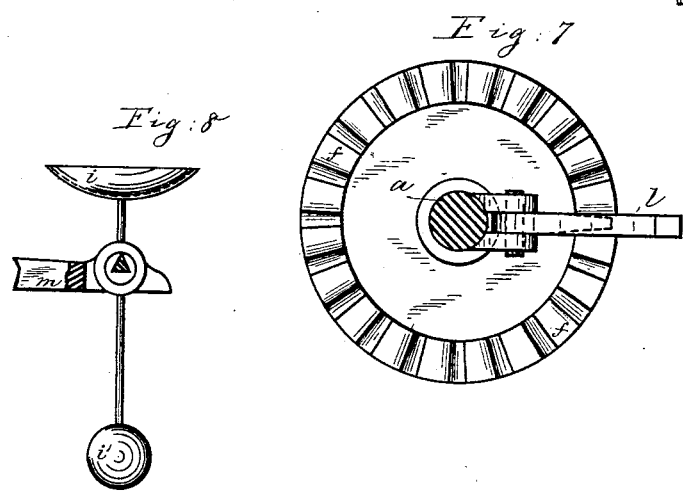
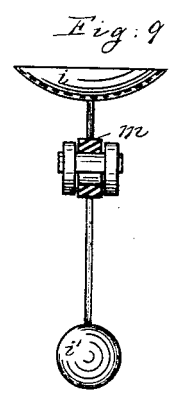

UNITED STATES PATENT OFFICE.

GUSTAV NITHACK, OF OBERNIGK, GERMANY.

DRUGGIST'S WEIGHING-SCALE.

SPECIFICATION forming part of Letters Patent No. 494,685, dated April 4, 1893.

Application filed February 5, 1891. Serial No. 380,349. (No model.)

*To all whom it may concern:*

Be it known that I, GUSTAV NITHACK, a subject of the German Emperor, and a resident of Obernigk, near Breslau, Germany, have invented a new and useful Improvement in Weighing-Scales, of which the following is a specification.

This invention relates to an improved weighing scale, more particularly designed for dispensing medicines and for similar purposes.

My improved scale permits the operator to rapidly subdivide a powder or other substance into a number of equally weighing masses, without removing the latter from the scale.

The invention consists in the various features of improvement more fully pointed out in the claims.

Figure 1:
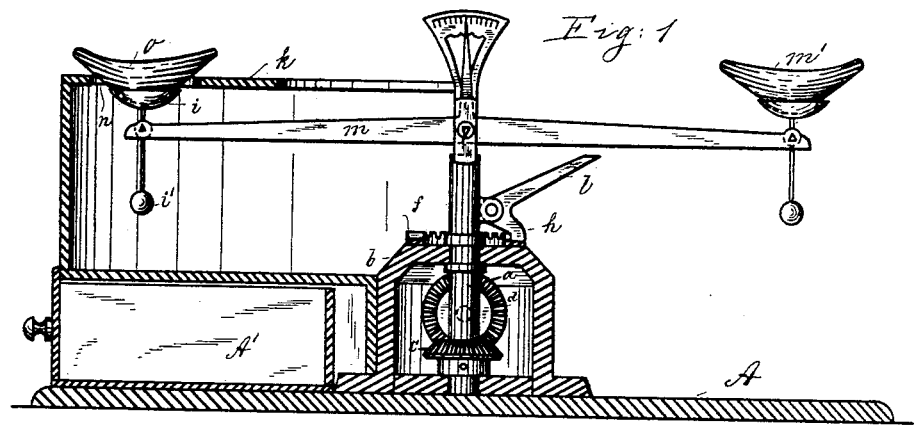
Figure 2:
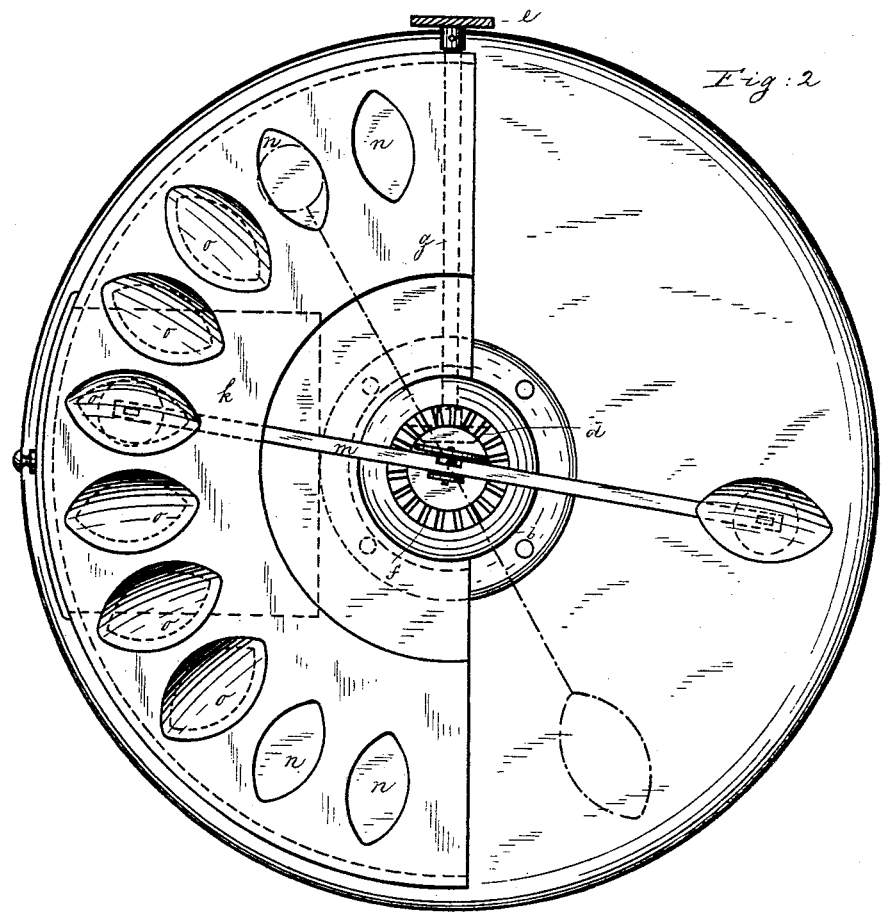
Figure 3:
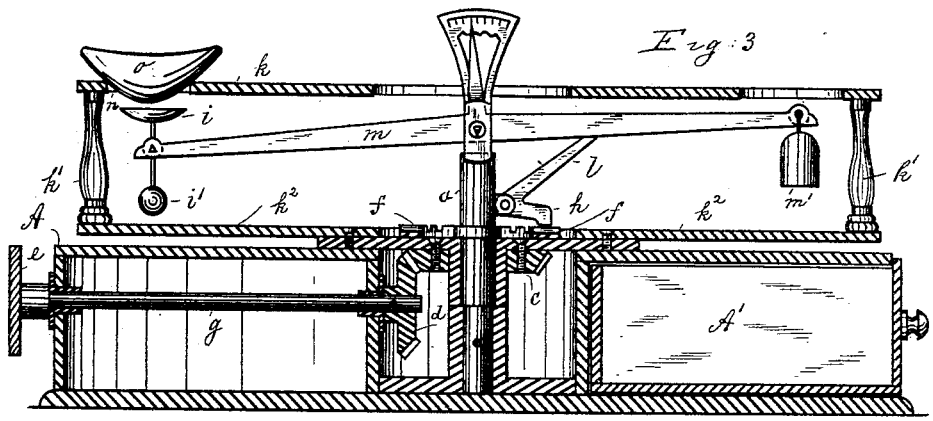
Figure 4:
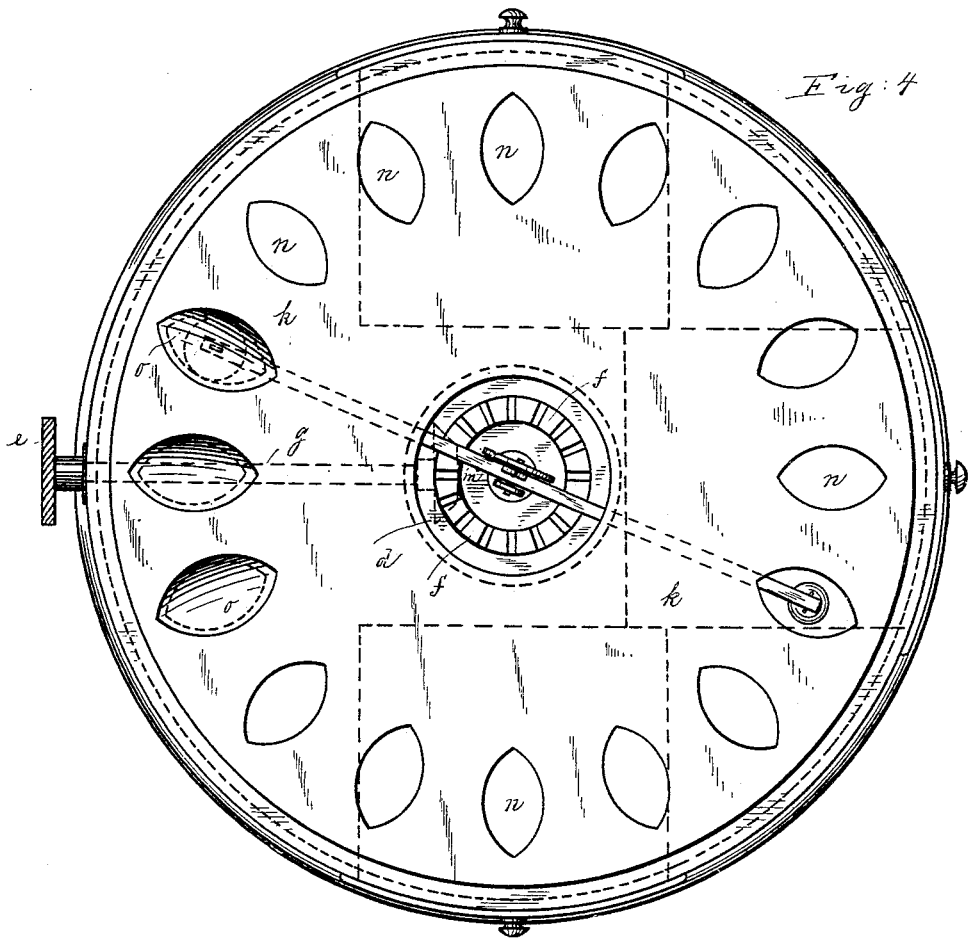

In the accompanying drawings: Figure 1 is a vertical central section of my improved weighing scale. Fig. 2 is a top view thereof. Figs. 3 and 4 are corresponding views of a modification; Fig. 5 a detail elevation of the post $a$, shown in Fig. 1, with the crown wheel in section; Fig. 6 an elevation of such post at right angles to Fig. 5. Fig. 7 is a top view of crown wheel $f$, showing shaft $a$ in section; Fig. 8 a vertical section through pan $i$, and Fig. 9 a section at right angles to Fig. 8.

The letter $a$, represents a post, free to turn in a hollow foot $b$, in which it has its bearings at the top and bottom. To the post $a$, there is keyed a bevel wheel $c$, that intergears with bevel wheel $d$. The wheel $d$, is secured to a shaft $g$, carrying a button $e$. By revolving this button, the wheel $d$, is revolved, to revolve in turn, the wheel $c$, and the post $a$. To the upper side of foot $b$, there is secured a crown wheel $f$, (Fig. 7) having beveled upwardly projecting teeth. These teeth are engaged by the lower arm $h$, of an elbow lever, pivoted to post $a$. The upper arm $l$, of this lever is placed directly under one arm of the scale beam $m$, pivotally supported by the post $a$. This scale beam carries at one end, the weight-carrying pan or weight $m'$, and at the other end a pan $i$, and counterweight $i'$. When a depression on the crown wheel $f$, is in line with the elbow lever, the latter swings down by its own gravity and the upper arm $l$, does not interfere with the play of the scale beam. But when a raised part of the wheel comes beneath the elbow lever, the latter will be pushed upward and the arm $l$, will hold the scale beam in a tilted position, such as shown in Fig. 3.

If the wheel $f$, is provided with say twenty, equally distanced teeth, each partial turn of the button $e$, will cause the post $a$, and with it the scale beam, to revolve over the twentieth part of a circle and will also cause such scale beam to be locked and unlocked.

To the frame A, of the scale, there is secured a top plate $k$, made of circular, semi-circular or other form. This plate has a series of openings $n$, placed at a uniform distance apart and corresponding in a radial position, to the position of the teeth on the crown wheel F.—In use, there is placed upon the openings $n$, a number of wrappers $o$, that are to contain the matter to be weighed off. These wrappers are supported by the plate $k$, directly over the openings $n$, and as many wrappers are put in place as there are powders, &c., to be weighed off.

At the beginning of the operation, the weight $m'$, will throw the pan $i$, up and out of one opening $n$, to raise the wrapper $o$, clear off the plate $k$. This wrapper is now filled, until the weight $m'$, is counterbalanced, when the pan $i$, will descend and will place the wrapper $o$, upon the plate $k$. A turn on button $e$, will now revolve crown wheel $f$, to hold the weighted arm of the scale beam up and to revolve the beam until the pan $i$, has arrived beneath the next opening $n$, when the elbow lever descends and the scale beam is liberated so that the pan $i$, will raise the wrapper $o$, over such opening. In this way, the wrappers $o$, may be filled in quick succession with accurately weighed quantities of the powder.

It is evident that the operation of the device would be the same, if the scale beam were fixed, and the plate $k$, were made to revolve. This modification is illustrated in Figs. 3 and 4. In these figures the plate $k$, is, by uprights $k'$, secured to a disk $k^2$, free to turn on frame A. The bevel wheel $c$, is not secured to the post $a$, but is secured to the disk $k^2$, so as to revolve the same, when the button $e$, is turned. The revolution of the bevel wheel $c$, will cause a corresponding revolution of the plate k, and thus the openings n, of such plate, are successively brought over the pan i, of the scale beam. The weighing operation is the same as described in relation to Figs. 1 and 2.

If desired a drawer A', may be provided, for containing the wrappers or weights.

In lieu of having the revolving motion described, the plate k, or the scale beam may be made to move in a longitudinal direction. The principle of causing the pan i, to come into line successively with one opening n, after the other of the wrapper-carrying plate, remains the same.

The advantages connected with my scales are numerous. A great saving of time is effected, accuracy and cleanliness is obtained and the manipulation is facilitated. Of course, the scale may be also built sufficiently heavy, to be used for merchandise generally.

What I claim is—

1. The combination of a perforated plate with a scale beam beneath such plate, and a pan i on the scale beam adapted to be projected successively through the perforations of the plate, substantially as specified.

2. The combination of a perforated plate with a scale beam beneath such plate, a lever controlling the scale beam and a crown wheel engaging the lever, substantially as specified.

3. The combination of a perforated plate with a horizontally rotatable scale beam beneath such plate, a lever controlling the scale beam, a crown wheel engaging the lever, and with a pan carried by the scale beam and adapted to be projected through the perforation of the plate, substantially as specified.

4. The combination of base b, with rotatable post a, hand shaft g intergeared therewith, crown wheel f, elbow lever l, h, engaging the same, scale beam m pivoted to post a, and with the perforated top plate k, substantially as specified.

In testimony whereof I have signed my name to this specification in the presence of two subscribing witnesses.

GUSTAV NITHACK.

Witnesses:
WILLIAM H. MUSSELMAN,
BERTHA MÜLLER.